United States Patent [19]

Manning

[11] 4,362,221
[45] Dec. 7, 1982

[54] VEHICLE DRIVE WHEEL SUSPENSION

[76] Inventor: Donald L. Manning, 4002 Normanwood Dr., Orchard Lake, Mich. 48033

[21] Appl. No.: 86,857

[22] Filed: Oct. 22, 1979

Related U.S. Application Data

[63] Continuation of Ser. No. 870,701, Jan. 19, 1978, abandoned, which is a continuation-in-part of Ser. No. 630,053, Nov. 7, 1975, abandoned.

[51] Int. Cl.³ .............................................. B60K 7/000
[52] U.S. Cl. .................... 180/73 R; 180/75; 180/88
[58] Field of Search ............ 180/71, 73 R, 73 C, 180/73 D, 73 TL, 73 TT, 75, 54 F, 56, 55, 57, 58, 62, 291, 297, 299; 280/925, 926

[56] References Cited

U.S. PATENT DOCUMENTS

| | | | |
|---|---|---|---|
| 1,733,042 | 10/1929 | Wright | 180/73 R |
| 2,037,464 | 4/1936 | Flogaus | 180/54 F |
| 2,067,807 | 1/1937 | Williams | 180/73 R |
| 2,132,963 | 10/1938 | Nallinger | 180/73 R |
| 2,231,287 | 2/1941 | Fox | 180/297 |
| 2,716,461 | 8/1955 | MacPherson | 180/73 R |
| 3,077,942 | 2/1963 | Kraemer | 180/73 D |
| 3,349,863 | 10/1967 | Wagner | 180/24.08 |
| 3,356,176 | 12/1967 | Herr | 180/73 R |
| 3,896,895 | 7/1975 | Schultz | 180/75 |
| 3,921,742 | 11/1975 | May | 180/297 |

FOREIGN PATENT DOCUMENTS

| | | | |
|---|---|---|---|
| 1233280 | 1/1967 | Fed. Rep. of Germany | 180/73 C |
| 467455 | 12/1951 | Italy | 180/71 |
| 702365 | 1/1954 | United Kingdom | 280/725 |

*Primary Examiner*—Joseph F. Peters, Jr.
*Assistant Examiner*—M. J. Hill
*Attorney, Agent, or Firm*—Reising, Ethington, Barnard, Perry & Brooks

[57] ABSTRACT

A wheel and engine support system comprising a vehicle body-mounted differential and swing-type live axles connected to the driving wheels, a dead axle in the form of a rack consisting of two cross members spaced fore and aft of the differential and two longitudinally extending wheel-bearing support members rigidly interconnecting the cross members inboard of the wheels, a universal pivot joint connecting one of the dead axle cross members to the vehicle body; and an engine supporting frame articulated to the vehicle body and a pair of links interconnecting the body and the engine supporting frame.

3 Claims, 7 Drawing Figures

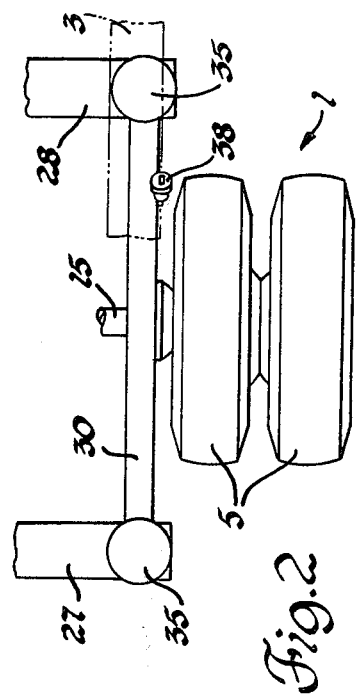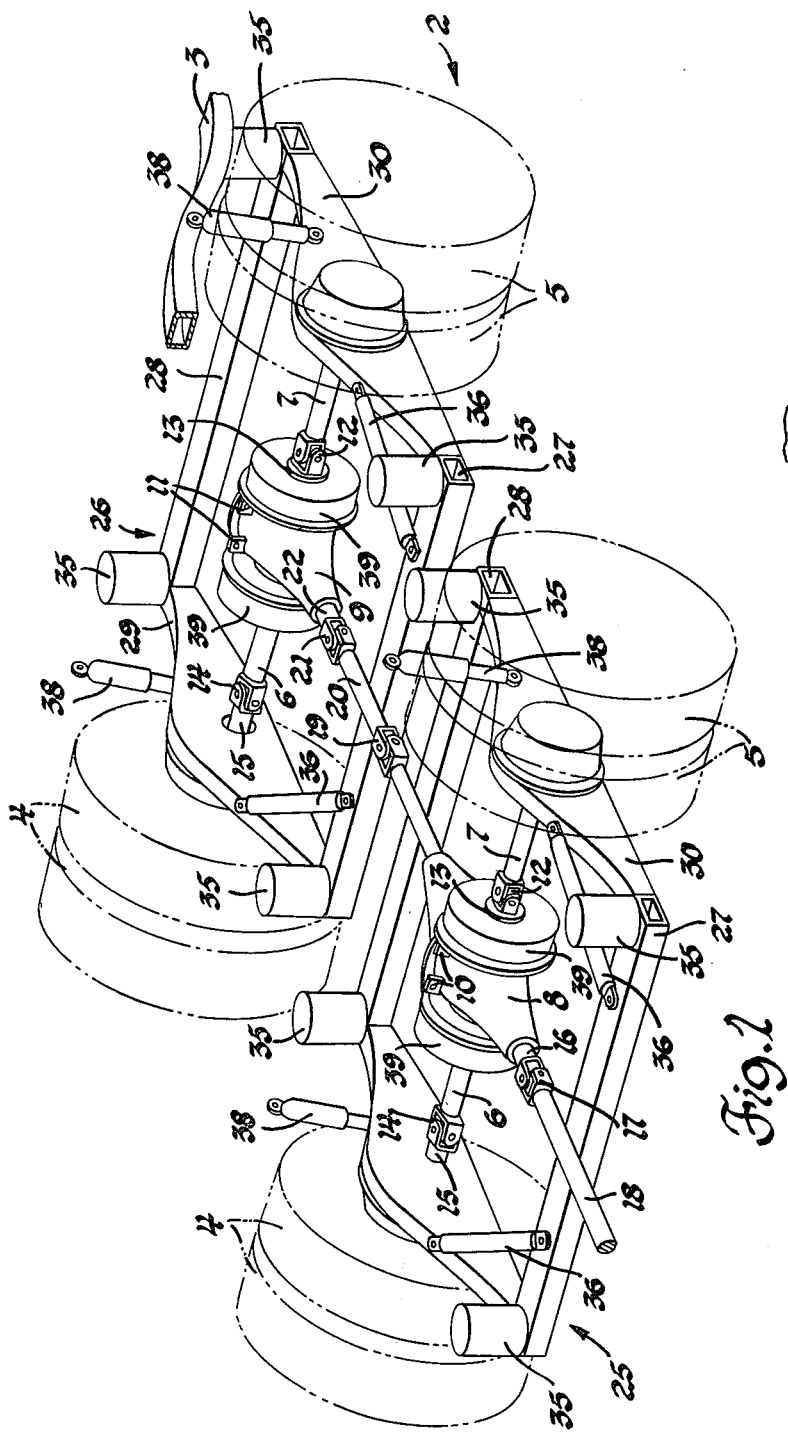

VEHICLE DRIVE WHEEL SUSPENSION

This is a continuation of application Ser. No. 870,701 filed Jan. 19, 1978, which is a continuation-in-part of application Ser. No. 630,053, filed Nov. 7, 1975, both now abandoned.

TECHNICAL FIELD

My invention relates to automotive vehicles, particularly trucks and buses, and more particularly the suspension of the driving wheels for such heavier types of vehicles.

BACKGROUND ART

It has been common practice in this art to support the drive wheels with a dead axle in the form of a housing extending transversely of the vehicle and through which extend live axle shafts connecting the wheels to differential gearing within an enlarged central portion of this housing. The vehicle body or frame (in the case where the body and frame are fabricated other than as a single unit) rests on springs which are supported by this axle housing a short distance inboard of each wheel, and the wheel brakes are interposed between the wheels and the springs.

Although this long-used standard type axle has advantages of ruggedness and simplicity of design, it also suffers from numerous disadvantages, chief among which are that vehicle loading is restricted by the necessity of maintaining vertical clearance between the body understructure and the differential and the fact that the differential, pinion and ring gear assembly, as well as all of the dead axle housing and of the live axles and a portion of the weight of the drive shaft from engine to the differential all contribute to the unsprung weight of the vehicle. While efforts have been made to eliminate this problem by mounting the differential to the vehicle body and using universal joints in the live axles, they have all entailed wheel supporting schemes that were deficient in ruggedness, simplicity of design, and cost for use in heavier trucks and buses.

As representative of such prior designs in which the differential is body-mounted are those wherein the wheel movements are controlled by a parallel arm type suspension as shown in U.S. Pat. No. 2,067,807 to Williams, by a wish-bone type suspension as shown in U.S. Pat. No. 2,988,161 to Herr, by a cross-beam pivotally connected to the wheel spindles as shown in U.S. Pat. No. 3,356,176 to Herr, by swinging half-axles shown in U.S. Pat. No. 2,675,085, and by a bowed dead axle as shown in U.S. Pat. No. 562,289 to De Dion et al.

The latter, De Dion type, suspension, of which later U.S. Pat. Nos. 2,716,461 to MacPherson, 2,753,190 to Hooven and 3,373,834 to Rosenkrands reprsented modifications, has the advantage of retaining a dead axle with rigid connections to the wheel bearing support members. Since the dead axle is bowed in the horizontal plane to clear the differential housing, it also contributes to lowering the vehicle body height (or increasing the payload) since limits on minimum body height are not dependent on maintaining vertical clearance thereof with the differential housing.

A serious drawback to the De Dion arrangement, however, and which has precluded its use on the heavier trucks and buses, is that the bowed configuration of the dead axle results in it being subjected to torsional stress in resisting relative vertical displacement of the left and right road wheels connected to it. Any significant torsional deflection of this dead axle would produce undesirable movements of the wheel axes, and the necessary torsional stiffening to avoid this so increases the weight and size of the axle as to make its use prohibitive from a cost and design standpoint.

My invention enables obtaining all the advantages of reduced unsprung weight, etc. from mounting the differential to the vehicle body, as well as the additional advantages of rigid support of the wheel bearings and vertical freedom of movement of the De Dion dead axle, without the undesirable torsional stressing inherent in the latter. I accomplish this by providing a rack-type dead axle having two generally straight cross-members which span the differential and ring gear housing and whose ends are rigidly interconnected by longitudinally extending members which constitute the bearing supports for the road wheels. The nearest similar arrangement of which I am aware is the dead axle in U.S. Pat. No. 2,132,983 to Nallinger which is bowed to clear the body-mounted differential, but is held in position by a system of spring biased rollers and a long forwardly extending wishbone pivoted to the body at its front end.

I am also aware that a rack-type dead axle in the form of an open rectangular or box-like frame is not new per se, being shown in U.S. Pat. Nos. 1,479,187 to Lansden, 2,410,133 to Spatta, and 3,896,895 to Schultz et al., for example. In all such prior art of which I an aware, however, its advantages in combination with a body-mounted differential have not been suggested or appreciated.

DISCLOSURE OF THE INVENTION

It is accordingly the principal object of my invention to provide an improved suspension for the drive wheels of a vehicle. A more specific object of the invention is to provide such a suspension wherein the differential (and pinion and ring gear) housing is carried by the body or body-frame structure of the vehicle and the wheels are drivingly connected to the differential by universal jointed live axles, the wheel bearings having rigid support members forming the laterally opposite ends of a rack-like dead axle whose other two members extend transversely of the vehicle with clearance for vertical movement forwardly and rearwardly, respectively, of the differential. Other objects of the invention concern the location of the vehicle body supporting springs and shock absorbers on the rack-like axle, and the location of the wheel brakes at the differential ends of the live axles.

The means by which these and other objects and advantages of the invention are attained will be better understood from the following description of four preferred embodiments of the invention selected for illustration, having reference to the attached drawings, wherein:

BRIEF DESCRIPTION OF DRAWINGS

FIG. 1 is a perspective view of a portion of a vehicle having tandem driving wheels and incorporating suspensions therefor in accordance with the invention;

FIG. 2 is a fragmentary plan view showing one of the sets of drive wheels and its adjacent portion of the suspension parts illustrated in FIG. 1;

BEST MODES FOR CARRYING OUT THE INVENTION

Figure 3:
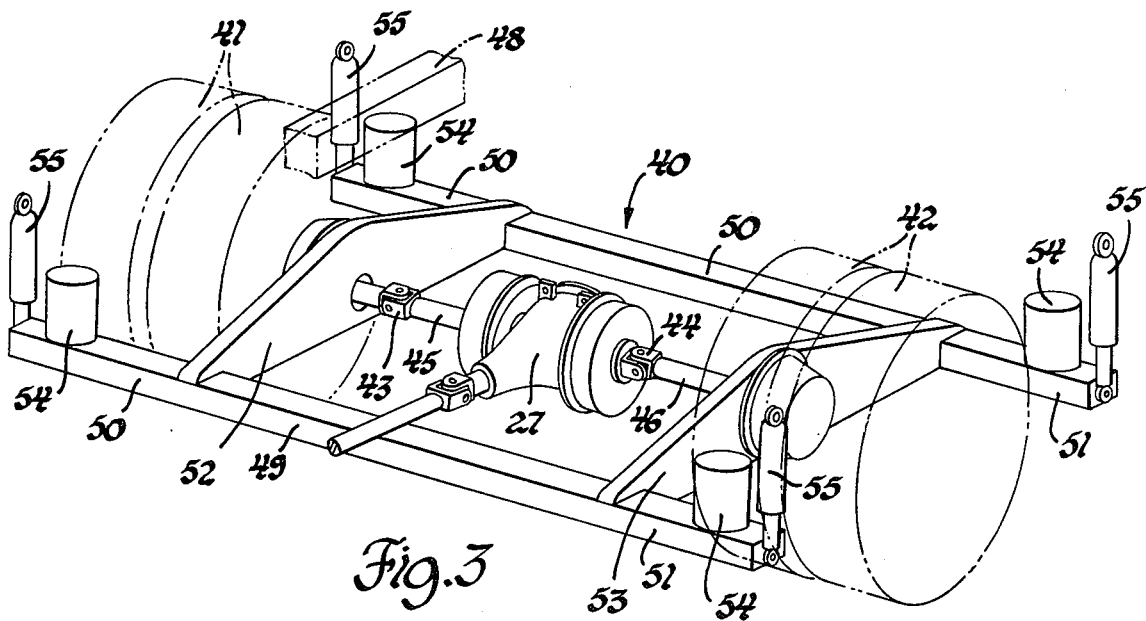
FIG. 3 is a perspective view similar to FIG. 1 but showing a modified form of the invention as applied to a single set of drive wheels, and wherein the dead axle transverse members are extended outboard fore and aft of the wheels for mounting the vehicle springs and shock absorbers more directly under the outer lateral extremities of the vehicle body.

Referring now in detail to the drawings, and first to FIGS. 1 and 2, numerals 1 and 2 designate generally the front and rear tandem drive units of a heavy-duty truck or bus vehicle, a portion of the body or body-frame of the vehicle being represented by the longitudinally extending sill member 3. Each driving unit is illustrated as having dual right and left wheels 4 and 5, which are drivingly connected by live axles 6 and 7 to the output shafts of their respective differentials. The housings 8 and 9 for these differentials (and their associated pinion and ring gear parts) are shown as having attaching lugs 10 and 11 by which they are mounted to suitable overlying members (not shown) of the vehicle body 3. To acccommodate vertical movement of these bodymounted differentials relative to the wheels, each of the live axles 6 and 7 has a standard universal joint 12 connecting its inner end to its associated differential output shaft 13 and another such universal joint 14 connecting its outer end to the spindle 15 of its associated wheel, together with a standard slip-spline connection (not shown) at one of its ends.

The pinion shaft 16 of the differential of the forward drive unit is shown as having its front end connected by a universal joint 17 to the rear end of a propeller shaft 18 driven by the vehicle engine (not shown), and at its rear end this pinion shaft is connected by a universal joint 19 to an intermediate propeller shaft 20 which is, in turn, connected by a universal joint 21 to the pinion shaft 22 of the rear unit differential. Preferably each of the differential pinion and ring gear assemblies within the housings 8 and 9 is of the hypoid type wherein the pinion shafts 16 and 22 enter their respective housings at levels relatively elevated in respect to their differential output shafts, in order that maximum clearance is available to accommodate vertical displacement of the dead axle structure now to be described.

The driving wheels 4 and 5 of the forward unit 1 are carried by a rack-type dead axle designated generally by the numeral 25, and likewise the driving wheels 4 and 5 of the rearward unit 2 are carried by a similar dead axle designated generally by the numeral 26. Each of these dead axles consists of front and rear cross-members 27, 28 which are rigidly interconnected adjacent their ends by right and left longitudinally extending members 29, 30. The wheel spindles 15 pass through and are journaled in these longitudinally extending members 29, 30, and thus the latter constitute wheel bearing support members. The front and rear cross-members 27, 28 of each dead axle 25, 26 are shown as generally straight box-like sections extending transversely of the vehicle in spaced relationship forwardly and rearwardly of the respective differential housing 8, 9 associated with its set of driving wheels, so as to span such housing and thereby accommodate vertical displacement of the dead axle with its wheels relative to the body mounted differential. There is ample vertical clearance between the rack cross-member and the propeller shafts 18 and 20 to accommodate such vertical displacement, particularly with the differential and ring gear assemblies being of the hypoid type as above referred to. Obviously, if desired, either or both of the cross-members 27, 28 of each dead axle 25, 26 may be fabricated other than as a straight member interconnecting the longitudinally extending wheel bearing support members 29, 30. In other words, these cross-members may have a bowed or curved configuration in either the vertical or horizontal plane or both, where such may be desirable from a design standpoint to conserve space or weight, it being only necessary that intermediate its ends each such cross-member has vertical freedom of movement relative to its associated differential housing 8, 9.

The vehicle body 3 rests on springs 35 which are connected to the rack-type dead axles 25, 26 adjacent the ends of the longitudinally extending wheel bearing support members 29, 30. For simplicity of illustration these springs 35 are schematically shown as being individually compressible units of the coil or air bag type; however, it is to be understood that leaf-type springs may instead be used if desired. Also shown are telescopic type shock absorbers connected to wheel bearing support members 29, 30 and extending upwardly therefrom to suitable connections (not shown) on body 3. In the embodiment illustrated in FIG. 1, wherein the springs 35 are of the coil or air cushion type, there are also provided stabilizing struts or radius rods 36 which are pivotally connected at one end to the rack and at the other end to the body 3.

My novel rack-type axle thus enables mounting the differential to the vehicle body without sacrificing the ruggedness of a conventional dead axle and differential housing in providing positive control of the wheel axes, and without the excessive weight and cost problems inherent in a De Dion type suspension. Since no torsional stressing is imposed on either the cross-members 27, 28 or their interconnecting wheel bearing support members 29, 30 and further since they do not have to carry the differential and ring gear structure, my rack-type axle need only be designed with sufficient strength to support the driving wheels and the vehicle body spring loads. Its weight may thus be made substantially less than that of either a standard dead axle or a De Dion type.

With the differentials mounted to the body, the vehicle body height can be lowered substantially (in the order of 4 inches below that of equivalent vehicle designed with a conventional axle), or in lieu thereof the payload may be correspondingly increased without encountering interference between the rack-type axle and the propeller shafts. Also, since the differential housings are not subjected to wheel displacement loads they may be made of much lighter construction and of materials which would greatly reduce the need for machining in fabrication. Also, as shown in FIG. 1, the wheel brake drums 39 may be located inboard adjacent the differential housings 8, 9 where there is ample space to permit use of substantially larger diameter drums than are possible with brakes conventionally located at the wheels. The inboard location also provides a cleaner atmosphere and enables inspection and servicing of the brakes without the necessity of removing the wheels from the vehicle. Brake lines serving such inboard brakes on the body-mounted differential are not subjected to the bouncing conditions of wheel mounted brakes, and hence could be made of solid tube construction. Likewise, anti-skid brake control devices may be more solidly and accurately mounted on the vehicle body and their performance thereby rendered more dependable than such devices are capable of where associated with wheel mounted brakes.

Figure 4:
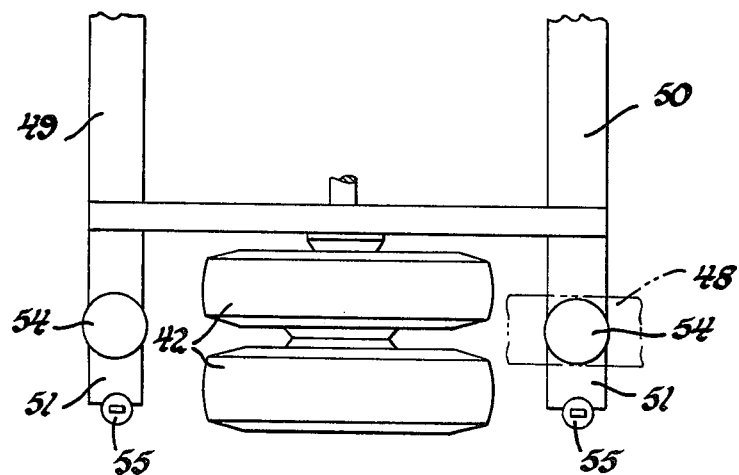
FIG. 4 is a fragmentary plan view of one end of the dead axle and its associated wheels shown in FIG. 3.

Referring now to the embodiment illustrated in FIGS. 3 and 4, a generally similar rack-type dead axle 40 is shown for a vehicle having a single set of dual driving wheels 41, 42 whose spindles are drivingly connected through universal joints 43, 44 and live axles 45, 46 to a differential having its housing 47 mounted to the vehicle body 48. As best shown in FIG. 4, the front and rear cross-members 49, 50 of this dead axle have their opposite ends 50, 51 extending outboard beyond the longitudinally extending wheel support members 52, 53. Such extension enables locating the springs 54 also outboard so as to underlie the outer side walls of the body 48 which are generally disposed in the midplane of the driving wheels. As shown, the shock absorbers 55 are also connected to the outer ends of these cross-member extensions for better control of body displacement during vehicle operation. As in tandem drive embodiment of FIGS. 1 and 2, the brake drums 56 are inboard, adjacent the differential.

As an alternative to the use of radius rods (e.g. 36 in FIG. 1), longitudinal and lateral stability of the rack axle may be provided by a universal pivotal connection between one of its cross-members and the body, and a single transverse stabilizer bar pivotally interconnecting its other cross-member and the body. Two such modified forms of the invention, which have particularly advantage in buses since they preserve the maximum amount of space for underbody baggage compartments, will now be described.

Figure 5:
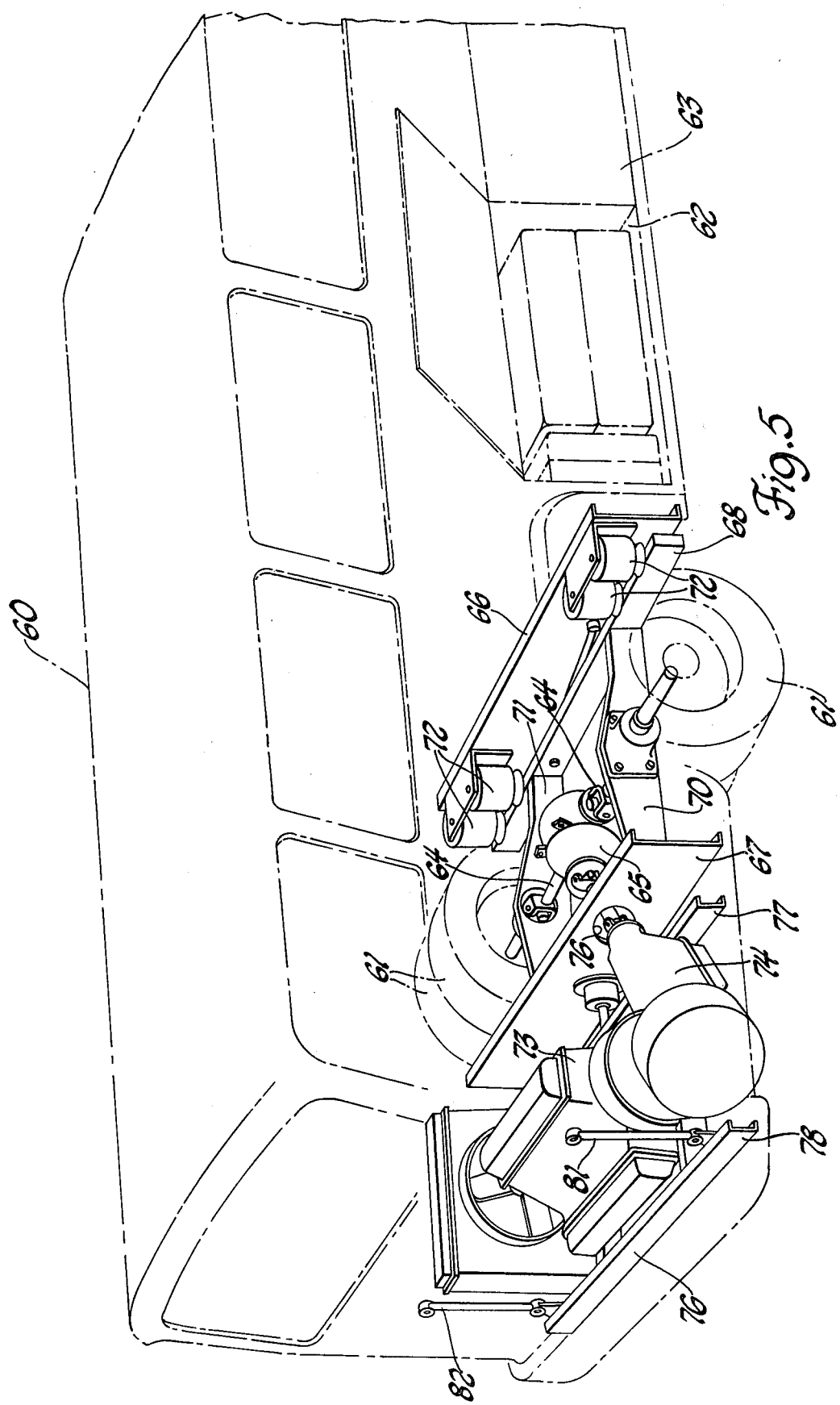
FIG. 5 is a perspective view generally similar to FIG. 3 but showing a further modified form of the invention applied to a single set of drive wheels of a bus having a transversely mounted engine with angle drive transmission connected to the differential, and wherein the supporting frame for the engine and the adjacent crossmember of the rack axle have universal pivotal connections to the vehicle body longitudinally opposite each other.
Figure 6:
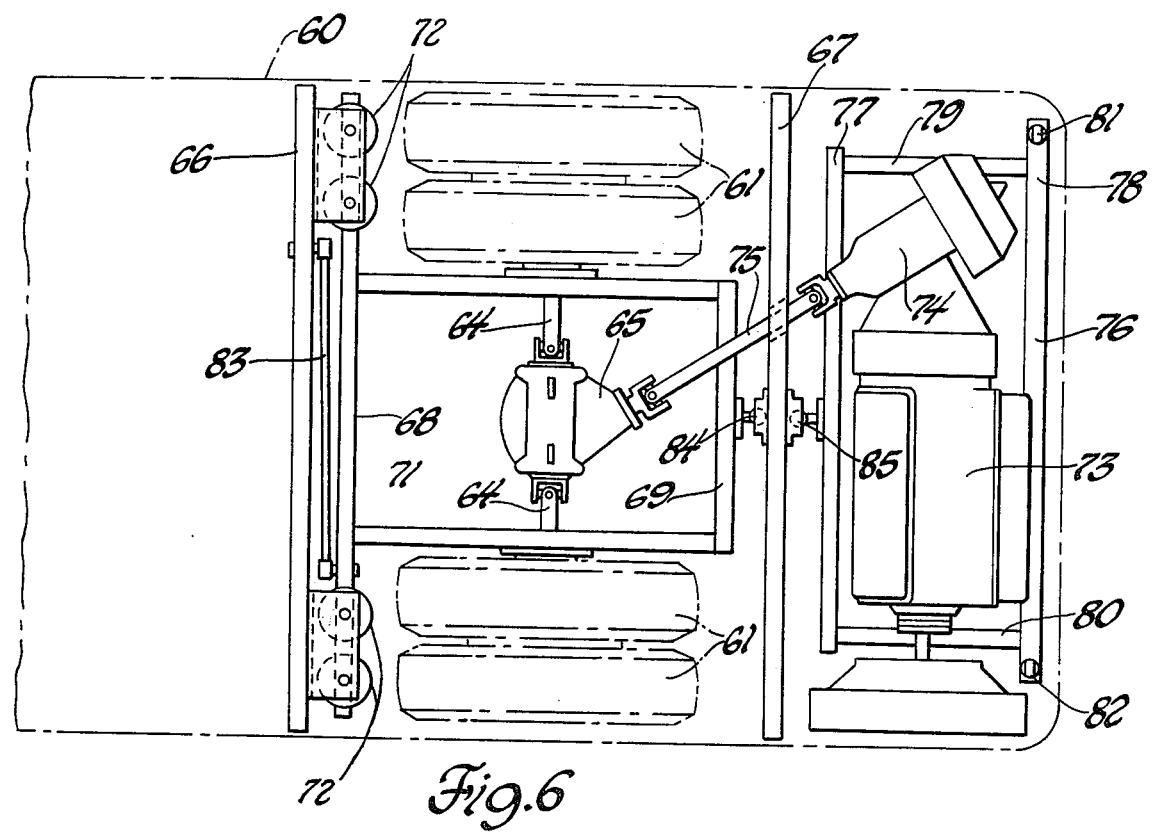
FIG. 6 is a partial plan view showing further details of the rack axle and associated engine and angle drive transmission of FIG. 5.

The first of these modifications is shown in FIGS. 5 and 6, wherein the exterior configuration of a bus 60 is indicated in broken outline, as are the driving wheels 61, and baggage compartments 62 and 63. It will be noted that these baggage compartments extend inwardly from the lower side wall of the bus, and that for maximum utilization of available space therefor the baggage compartment 62 nearest the driving wheels on that side is located as close as possible thereto. As in the previously described embodiments of FIGS. 1 and 2, the driving wheels are connected by universally jointed live axles 64 to a differential 65 which is securely mounted to the vehicle body. Shown as integral parts of the body are two transverse frame members 66 and 67 between which is located the rack axle having its two cross-members 68, 69 spaced forwardly and rearwardly of the differential by their rigidly interconnecting, longitudinally extending wheel bearing support members 70, 71. The cross-member 68 extends outboard of the wheel bearing support members 70, 71, and its outboard ends support the body at the transverse frame member 66 through spring means, shown in the form of air bag type springs 72.

On the opposite side of the body transverse frame member 67 from the rack axle is shown a transversely mounted engine 73 having a V-drive transmission 74 which is drivingly connected to the differential by a prop shaft 75 passing through an opening 76 in the frame member 67. The engine and its V-drive transmission are mounted on a sub-frame 76, shown in the form of two transverse channel members 77, 78 jointed together adjacent their ends by two longitudinal channel members 79, 80. As best seen in FIG. 5, a pair of generally vertically extending links 81, 82 have their lower ends pivotally connected to the lateral extremities of the transverse channel member 78, and the upper ends of these links are pivotally connected to the body.

As best seen in FIG. 6, the spring supporting cross-member 68 of the rack axle is pivotally connected adjacent one of its ends to one end of a transverse stabilizer bar 83, whose other end is pivotally connected to body transverse frame member 66 adjacent the opposite end of the cross-member 68. Intermediate the wheel bearing support members 70, 71 and preferably equidistant therefrom, is a universal pivotal connection 84 between the other cross-member of the rack axle and the body transverse frame member 67. Longitudinally opposite this universal pivotal connection 84 is a universal pivotal connection 85 between the transverse frame member 67 and the transverse channel memer 77 of the engine and transmission sub-frame 76.

While this arrangement retains all the advantages of lowered vehicle body height, increased payload and ruggedness of wheel support which characterize the previously described embodiments of the invention, it also has the further advantage of providing a more compact design for the suspension. Thus the universal pivotal connection 84 and the transverse stabilizer bar extend the longitudinal space required for the rack axle only minimally in the vehicle, a factor that is of considerable importance in the larger intercity buses where under-floor baggage compartment space must be as large as possible. Also, the elimination of all but the single transverse stabilizer bar substantially reduces the cost of construction, as well as simplifies the manufacture and maintenance of the vehicle. It will further be appreciated that the longitudinally opposite relation of the two universal pivotal connections 84 and 85 is advantageous in such an application of the rack axle in conjunction with a transverse engine and V-drive transmission since their respective thrust forces longitudinally of the vehicle may oppose each other with minimum stressing of the body transverse frame member 67.

Figure 7:
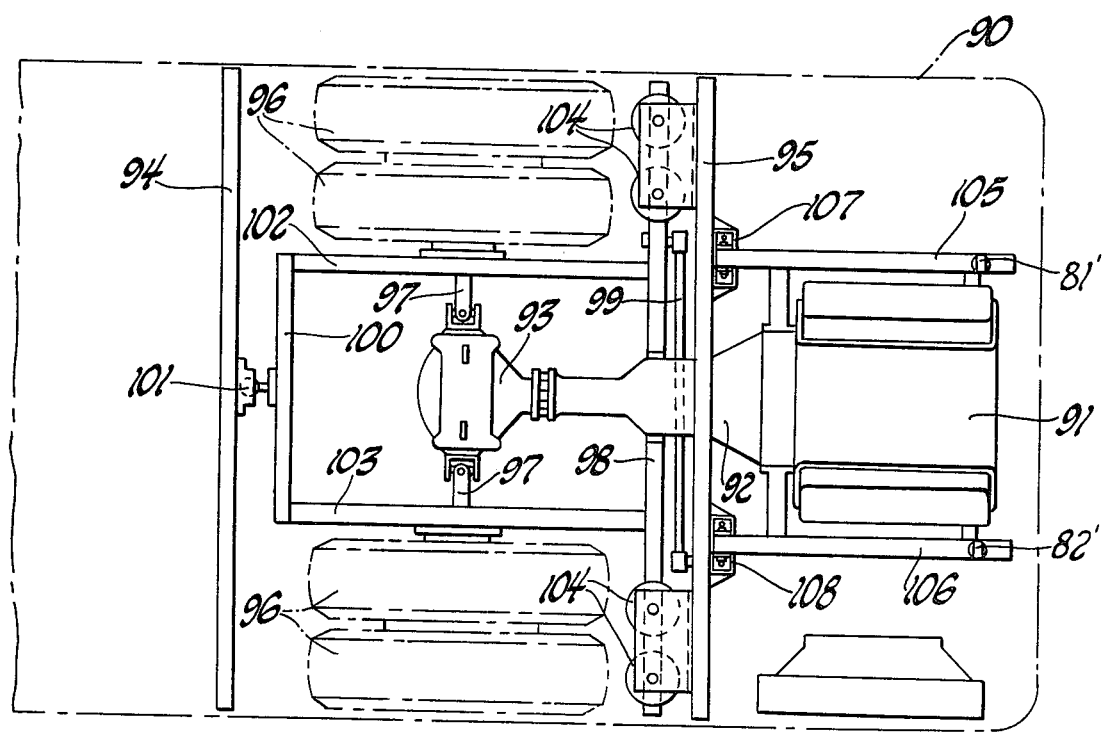
FIG. 7 is a view similar to FIG. 6, but showing a still further modification of the invention in association with an in-line engine, transmission and differential drive train.

FIG. 7 shows a similar bus 90, but with an in-line arranged engine 91 and transmission 92 drivingly connected to the differential 93. As in the previously described embodiments, the differential is securely mounted to the body, two transverse frame members 94 and 95 of which are shown, and the driving wheels 96 are connected to the differential by U-jointed live axles 97. Because of the in-line location of the transmission, the rack axle cross-member 98 nearest the engine is pivotally connected to the body by the transverse stabilizer bar 99, and the other cross-member 100 of the rack axle has the universal pivotal connection 101 to the body intermediate the rack axle longitudinal wheel supporting members 102 and 103. Also in this arrangement as shown, the cross-member 98 has its ends extending outboard of the longitudinal members 102, 103 and supporting the springs 104. Also because of the in-line drive, the sub-frame for the engine transmission unit has its longitudinally extending elements 105 and 106 connected to the transverse frame member 95 of the body by conventional rubber mounts 107, 108, respectively, rather than by a single universal pivotal connection like that shown at 85 in FIGS. 5 and 6. The engine-transmission sub-frame, through its elements 105 and 106, is again pivotally connected to the vehicle body through links 81' and 82'.

Notwithstanding the different location of the single transverse stabilizer bar 99 and the universal pivotal connection 101 to the body from that shown in the FIGS. 5, 6 embodiment, it will be appreciated that this FIG. 7 suspension retains all the advantages of lowered vehicle height, increased payload and ruggedness of wheel support, while still preserving the maximum underbody baggage compartment space longitudinally adjacent the driving wheels.

While preferred embodiments of the vehicle drive wheel suspension have been shown and described herein in detail, those skilled in this art will recognize various alternative designs and embodiments for practicing the present invention as defined by the following claims.

What is claimed is:

1. In a vehicle, a body member, a differential securely mounted to the body member, driving wheels laterally opposite the differential, live axles drivingly interconnecting the differential and wheels and having universal joints accommodating swinging movement of the wheels relative to the differential, a dead axle for carrying said wheels, said dead axle being in the form of a rack of generally rectangular configuration as viewed in plan and having two cross-members, one cross-member spaced rearwardly of the differential and the other cross-member spaced fowardly of the differential, two wheel bearing support members extending longitudinally of the vehicle between said cross-members, said cross-members and wheel carrying members being rigidly interconnected adjacent their respective ends, spring means interposed between said body member and said rack, a universal pivotal connection between the body and one of said cross-members intermediate said wheel bearing support members, an engine extending transversely of the vehicle and spaced longitudinally thereof from said one cross-member, said engine having an angle-drive transmission at its output end, a prop shaft having universal joints at its opposite ends drivingly connected to said transmission and differential respectively, a supporting frame for said engine, a pair of generally vertically extending links pivotally interconnecting the body and the lateral extremities of said frame, and a universal pivotal connection between said frame and the body longitudinally opposite said universal pivotal connection between the body and said one cross-member.

2. The structure of claim 1, including a bar extending transversely of the vehicle, one end of said bar having a pivotal connection to the body accommodating vertical swinging movement of the bar relative to the body, the other end of said bar having a pivotal connection to the other of said cross-members accommodating vertical swinging movement of the bar relative to said other cross-member.

3. In a vehicle, a body member, a differential securely mounted to the body member, driving wheels laterally opposite the differential, live axles drivingly interconnecting the differential and wheels and having universal joints accommodating swinging movement of the wheels relative to the differential, a dead axle for carrying said wheels, said dead axle being in the form of a rack of generally rectangular configuration as viewed in plan and having two cross-members, one cross-member spaced rearwardly of the differential and the other cross-member spaced forwardly of the differential, two wheel bearing support members extending longitudinally of the vehicle between said cross-members, said cross-members and wheel bearing support members being rigidly interconnected adjacent their respective ends, spring means interposed between said body member and said rack, a universal pivotal connection between the body and one of said cross-members intermediate said wheel bearing support members, an engine speed longitudinally rearwardly from said one cross-member, a transmission interconnecting said engine and said differential, a supporting frame for said engine, a pair of links pivotally interconnecting the body and the lateral extremities of said frame, and means articulating said frame to said body to allow limited movement of the frame relative to the body.

* * * * *